US009709852B2

(12) United States Patent
Lee et al.

(10) Patent No.: US 9,709,852 B2
(45) Date of Patent: Jul. 18, 2017

(54) CURVED LIQUID CRYSTAL DISPLAY AND METHOD OF MANUFACTURING THE SAME

(71) Applicant: Samsung Display Co., Ltd., Yongin-si (KR)

(72) Inventors: Hyeok Jin Lee, Seongnam-si (KR); Oh Jeong Kwon, Hwaseong-si (KR); Su Jin Kim, Seoul (KR); Jin Won Kim, Suwon-si (KR); Dong Han Song, Hwaseong-si (KR); Ki Chul Shin, Seongnam-si (KR); Dong-Chul Shin, Seoul (KR); Sung-Jae Yun, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/049,448

(22) Filed: Feb. 22, 2016

(65) Prior Publication Data

US 2016/0259211 A1 Sep. 8, 2016

(30) Foreign Application Priority Data

Mar. 5, 2015 (KR) ........................ 10-2015-0031193

(51) Int. Cl.
*C09K 19/00* (2006.01)
*G02F 1/1337* (2006.01)
(Continued)

(52) U.S. Cl.
CPC ...... *G02F 1/133711* (2013.01); *G02F 1/1341* (2013.01); *G02F 1/13439* (2013.01);
(Continued)

(58) Field of Classification Search
CPC ............. G02F 1/1337; G02F 1/133711; G02F 1/133707; G02F 1/133788; G02F 1/1341;
(Continued)

(56) References Cited

U.S. PATENT DOCUMENTS 8,514,357 B2 8/2013 Kim
8,619,222 B2 12/2013 Nakamura et al.
(Continued)

FOREIGN PATENT DOCUMENTS

EP 2131233 A1 12/2009
EP 2829909 A1 1/2015
(Continued)

OTHER PUBLICATIONS

European Search Report-European Application No. 16157490.0 dated May 11, 2016.
(Continued)

*Primary Examiner* — Ruiyun Zhang
(74) *Attorney, Agent, or Firm* — Cantor Colburn, LLP

(57) ABSTRACT

A curved liquid crystal display includes: a first substrate; a second substrate facing the first substrate; a liquid crystal layer between the first substrate and the second substrate and including liquid crystal molecules; a first alignment layer between the first substrate and the liquid crystal layer; and a second alignment layer between the second substrate and the liquid crystal layer. The first alignment layer and the second alignment layer respectively include a polymer having at least one main chain and a plurality of side chains connected to the main chain, and at least one of the polymer of the first alignment layer and the polymer of the second alignment layer includes at least one side chain including at least one of a photo-reactor and a photo-reactor derivative.

23 Claims, 14 Drawing Sheets

(51) Int. Cl.
*G02F 1/1341* (2006.01)
*G02F 1/1343* (2006.01)
*G02F 1/1333* (2006.01)

(52) U.S. Cl.
CPC .. *G02F 1/133707* (2013.01); *G02F 1/133788* (2013.01); *G02F 2001/133397* (2013.01); *G02F 2001/133761* (2013.01); *G02F 2001/133776* (2013.01)

(58) Field of Classification Search
CPC ..... G02F 1/13439; G02F 2001/133776; G02F 2001/133397; G02F 2001/133761; C09K 19/56; C09K 19/348
USPC ......... 428/1.1, 1.2, 1.26; 349/123, 128, 129, 349/130, 134, 136
See application file for complete search history.

(56) References Cited

U.S. PATENT DOCUMENTS

| | | |
|---|---|---|
| 8,632,862 B2 | 1/2014 | Kim et al. |
| 8,830,428 B2 | 9/2014 | Miyakawa et al. |
| 2011/0134382 A1 | 6/2011 | Miyakawa et al. |
| 2011/0157531 A1 | 6/2011 | Suwa et al. |
| 2011/0299020 A1 | 12/2011 | Takagi |
| 2015/0029455 A1* | 1/2015 | Kim ................. G02F 1/133753 349/129 |
| 2016/0032190 A1* | 2/2016 | Lim ....................... C09K 19/56 349/123 |

FOREIGN PATENT DOCUMENTS

| | | |
|---|---|---|
| EP | 2843466 | 3/2015 |
| EP | 2131233 B1 | 3/2017 |
| KR | 100283843 | 12/2000 |
| KR | 100348151 | 7/2002 |
| KR | 1020040034592 | 4/2004 |
| KR | 100451442 | 9/2004 |
| KR | 1020100084823 | 7/2010 |
| KR | 1020150012093 | 2/2015 |
| WO | 2013156053 | 10/2013 |

OTHER PUBLICATIONS

Yohei Nakanishi, "Polymer Layer and Tilt Angle of Polymer-Sustained-Alignment Liquid Crystal Displays", Japanese Journal of Applied Physics, vol. 53, (2014), paged 071601-1-071601-6.

* cited by examiner

CURVED LIQUID CRYSTAL DISPLAY AND METHOD OF MANUFACTURING THE SAME

This application claims priority to Korean Patent Application No. 10-2015-0031193 filed on Mar. 5, 2015, and all the benefits accruing therefrom under 35 U.S.C. §119, the content of which is its entirety is herein incorporated by reference.

BACKGROUND (a) Field

The present disclosure relates to a curved liquid crystal display and a manufacturing method thereof.

(b) Description of the Related Art

A liquid crystal display device generally includes two display panels with field generating electrodes such as a pixel electrode and a common electrode, and a liquid crystal layer interposed therebetween. The liquid crystal display device generates an electric field in the liquid crystal layer by applying voltage to the field generating electrodes. The generated electric field determines the alignment direction of the liquid crystal molecules within the liquid crystal layer thereby controlling polarization of incident light so as to display images.

An example of such a liquid crystal display device includes a vertically aligned (VA) mode liquid crystal display device, in which long axes of the liquid crystal molecules are aligned to be vertical to the display panels in the absence of the electric field. The VA-mode liquid crystal display has a large contrast ratio and easily implements a wide reference viewing angle.

In order to implement a wide viewing angle and increase the response speed of the liquid crystals, methods of allowing the liquid crystals to have a pre-tilt by adding a reactive mesogen to an alignment layer or to a liquid crystal layer have been developed.

In recent advances, liquid crystal displays have become larger, and curved liquid crystal display devices have been developed to heighten the viewer's sense of immersion when viewing large-sized liquid crystal displays.

SUMMARY

A curved liquid crystal display can be developed by forming components on each of two display panels, attaching the display panels together to prepare a flat-panel liquid crystal display, and then bending it. However, in such a curved liquid crystal display, a misalignment may occur between the two display panels, resulting in decreased transmittance.

The present disclosure has been made in an effort to provide a curved liquid crystal display that can alleviate occurrence of an afterimage by optimizing reactivity of a reactive mesogen. Methods for manufacturing the curved liquid crystal display are also provided.

In addition, the present disclosure provides a curved liquid crystal display that can prevent transmittance from being decreased due to misalignment of a curved liquid crystal display, and a method for manufacturing the same.

In exemplary embodiments, a curved liquid crystal display includes: a first substrate; a second substrate facing the first substrate; a liquid crystal layer between the first substrate and the second substrate and including liquid crystal molecules; a first alignment layer between the first substrate and the liquid crystal layer; and a second alignment layer between the second substrate and the liquid crystal layer. The first alignment layer and the second alignment layer respectively include a polymer, the polymer including at least one main chain and a plurality of side chains connected to the main chain, and at least one of the polymer of the first alignment layer and the polymer of the second alignment layer includes at least one side chain including at least one of a photo-reactor and a photo-reactor derivative.

In an exemplary embodiment, the polymer of the first alignment layer may include the at least one side chain including the at least one of the photo-reactor and the photo-reactor derivative, and the side chain of the polymer of the second alignment layer may not include the photo-reactor and the photo-reactor derivative.

In an exemplary embodiment, the curved liquid crystal display may further include bumps on at least one of the first alignment layer and the second alignment layer, the bumps including an alignment polymer.

In another exemplary embodiment, the density of bumps on the first alignment layer may be greater than the density of bumps on the second alignment layer.

In yet another exemplary embodiment, the size of bumps on the first alignment layer may be smaller than the size of bumps on the second alignment layer.

In an exemplary embodiment, the at least one of the photo-reactor and the photo-reactor derivative may be positioned at an end of the at least one side chain In exemplary embodiments, the photo-reactor may be represented by Chemical Formula 3A-1 or Chemical Formula 3B-1, and the photo-reactor derivative may be a derivative of the photo-reactor represented by Chemical Formula 3A-1 or Chemical Formula 3B-1:

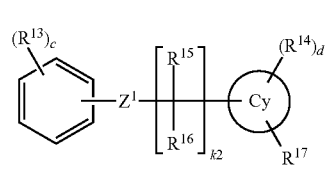

Chemical Formula 3A-1

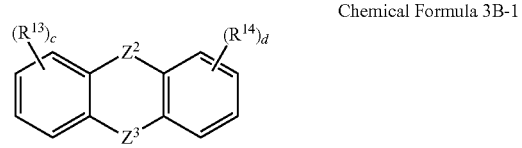

Chemical Formula 3B-1 where, in Chemical Formula 3A-1 and Chemical Formula 3B-1, Cy is a C6 to C18 aryl group of or a C6 to C18 cycloalkyl group; $R^{13}$ to $R^{14}$ are independently hydrogen or a substituted or unsubstituted C1 to C8 alkyl group; $R^{15}$ and $R^{16}$ are independently a hydroxy group or a substituted or unsubstituted C1 to C8 alkoxy group; $R^{17}$ is hydrogen, a hydroxy group, or a substituted or unsubstituted C1 to C8 alkoxy group; c and d are respectively independently integers of 0 to 4; k2 is an integer of 0 to 5; $Z^1$ and $Z^2$ are respectively independently —C(=O)—; and $Z^3$ is —S— or —C(=O)—.

In an exemplary embodiment the photo-reactor may include at least one of the compounds represented by Chemical Formula 3-1, Chemical Formula 3-2, Chemical Formula 3-3, Chemical Formula 3-4, and Chemical Formula 3-5:

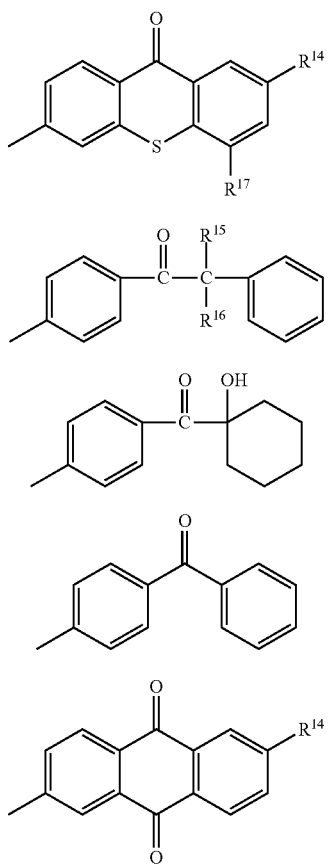

Chemical Formula 3-1

Chemical Formula 3-2

Chemical Formula 3-3

Chemical Formula 3-4

Chemical Formula 3-5 wherein, in Chemical Formula 3-1, Chemical Formula 3-2, and Chemical Formula 3-5, $R^{14}$ is independently hydrogen or a substituted or unsubstituted C1 to C8 alkyl group; $R^{15}$ and $R^{16}$ are respectively independently a hydroxy group or a substituted or unsubstituted C1 to C8 alkoxy; and $R^{17}$ is hydrogen, hydroxy group or a substituted or unsubstituted C1 to C8 alkoxy group.

In an exemplary embodiment, a pre-tilt of liquid crystal molecules adjacent to the first alignment layer and a pre-tilt of liquid crystal molecules adjacent to the second alignment layer layer may be different from each other.

In another exemplary embodiment, the pre-tilt of the liquid crystal molecules arranged adjacent to the first alignment layer may be greater than the pre-tilt of the molecules arranged adjacent to the second alignment layer.

In yet another exemplary embodiment, the first substrate and the second substrate may include curved sides.

In an exemplary embodiment, the liquid crystal molecules adjacent to the second alignment layer may be substantially perpendicular to the second alignment layer.

In another exemplary embodiment, the side chain may further include a vertical alignment group.

According to an exemplary embodiment, a method for manufacturing a curved liquid crystal display is provided. The method includes: forming a pixel electrode on a first substrate; forming a common electrode on a second substrate that faces the first substrate; forming a first alignment layer on the pixel electrode; forming a second alignment layer on the common electrode; forming a liquid crystal layer between the first alignment layer and the second alignment layer, the liquid crystal layer including liquid crystal molecules and a reactive mesogen; and irradiating the liquid crystal layer with light while applying an electric field, where the first alignment layer and the second alignment layer respectively include a polymer including at least one main chain and a plurality of side chains connected to the main chain, and at least one of the polymer of the first alignment layer and the polymer of the second alignment layer includes at least one side chain including a photo-reactor.

In an exemplary embodiment, the polymer of the first alignment layer may include the at least one side chain including the photo-reactor, and the side chain of the polymer of the second alignment layer may not include the photo-reactor.

In an exemplary embodiment, the irradiating the liquid crystal layer with light includes polymerizing the reactive mesogen and forming bumps on at least one of the first alignment layer and the second alignment layer.

In an exemplary embodiment, density of bumps on the first alignment layer may be greater than density of bumps on the second alignment layer.

In another exemplary embodiment, after irradiating the liquid crystal layer with light, a pre-tilt of liquid crystal molecules adjacent to the first alignment layer may become greater than a pre-tilt of liquid crystal molecules adjacent to the second alignment layer.

In an exemplary embodiment, the side chain of the polymer of the second alignment may include a vertical alignment group.

In an exemplary embodiment, the second alignment layer may further include at least one side chain including a vertical alignment group.

According to exemplary embodiments, a photo-reactor or a photo-reactor derivative is included in a side chain of the polymer forming an alignment layer. The presence of the photo-reactor optimizes reactivity of the reactive mesogen thereby minimizing the occurrence of an afterimage n.

In addition, a decrease in transmittance due to misalignment can be prevented by setting the pre-tilt of the liquid crystal molecules positioned adjacent to the upper alignment layer to be different from the pre-tilt of the liquid crystal molecules positioned adjacent to the lower alignment layers.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
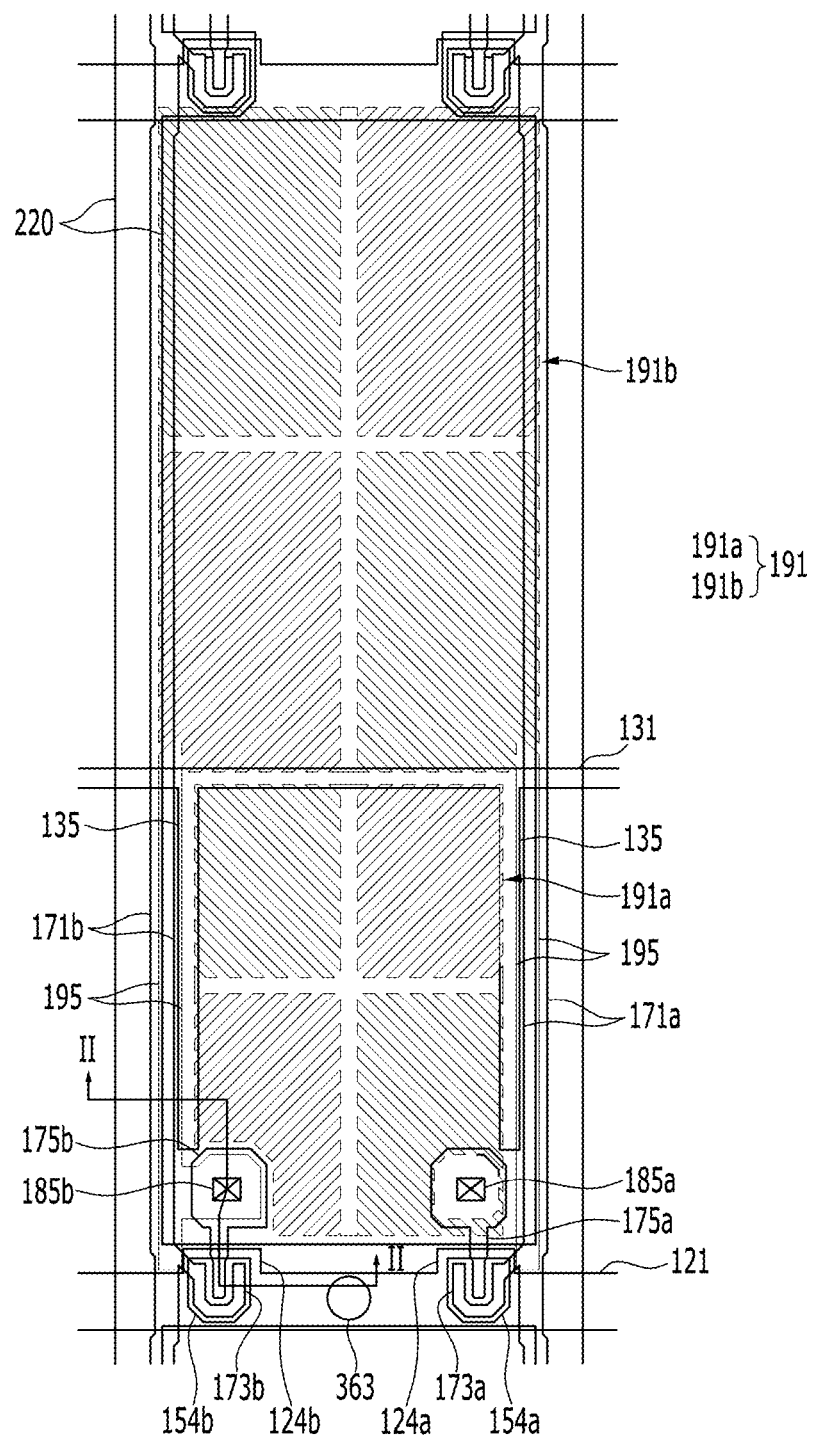
FIG. 1 is a top plan view of an exemplary embodiment of a liquid crystal display according to the present disclosure.

The present disclosure will be described more fully hereinafter with reference to the accompanying drawings, in which various exemplary embodiments are shown. As those skilled in the art would realize, the described embodiments may be modified in various different ways, all without departing from the spirit or scope of the present disclosure. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless particularly mentioned in the present specification, the term "substituted" means that at least one hydrogen atom is substituted by a substituent group of a halogen atom (F, Cl, Br, I), a hydroxy group, a C1 to C20 alkoxy group, a nitro group, a cyano group, an amino group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C30 heteroaryl group, or a combination thereof.

Further, unless particularly mentioned in the present specification, the term "hetero" means that at least one hetero atom of N, O, S, and P is included in a cyclic group.

Further, unless particularly mentioned in the present specification, the term "alicyclic" means C3 to C40 cycloalkyl, C3 to C40 cycloalkenyl, C3 to C40 cycloalkynyl, C3 to C40 cycloalkylene, C3 to C40 cycloalkenylene, or C3 to C40 cycloalkynylene, and specifically means C3 to C20 cycloalkyl, C3 to C20 cycloalkenyl, C3 to C20 cycloalkynyl, C3 to C20 cycloalkylene, C3 to C20 cycloalkenylene, or C3 to C20 cycloalkynylene, and the term "aromatic" means C6 to C40 aryl, C2 to C40 heteroaryl, C6 to C40 arylene, or C2 to C40 heteroarylene, and specifically means C6 to C16 aryl, C2 to C16 heteroaryl, C6 to C16 arylene, or C2 to C16 heteroarylene.

Further, unless particularly mentioned in the present specification, the term "combination" generally means mixing or copolymerization, and means that in an alicyclic organic group and an aromatic organic group, two or more cycles form a fused cycle or two or more cycles are connected to each other by a functional group of a single bond, —O—, —S—, —C(=O)—, —CH(OH)—, —S(=O)—, —S(=O)2-, —Si(CH3)2-, —(CH2)p- (herein, 1≤p≤2), —(CF2)q- (herein, 1≤q≤2), —C(CH3)2-, —CH(CH3)-, —C(CF3)2-, —CH(CF3)-, or —C(=O)NH—. Herein, the term "copolymerization" means block copolymerization or random copolymerization, and the term "copolymer" means a block copolymer or a random copolymer.

Figure 2:
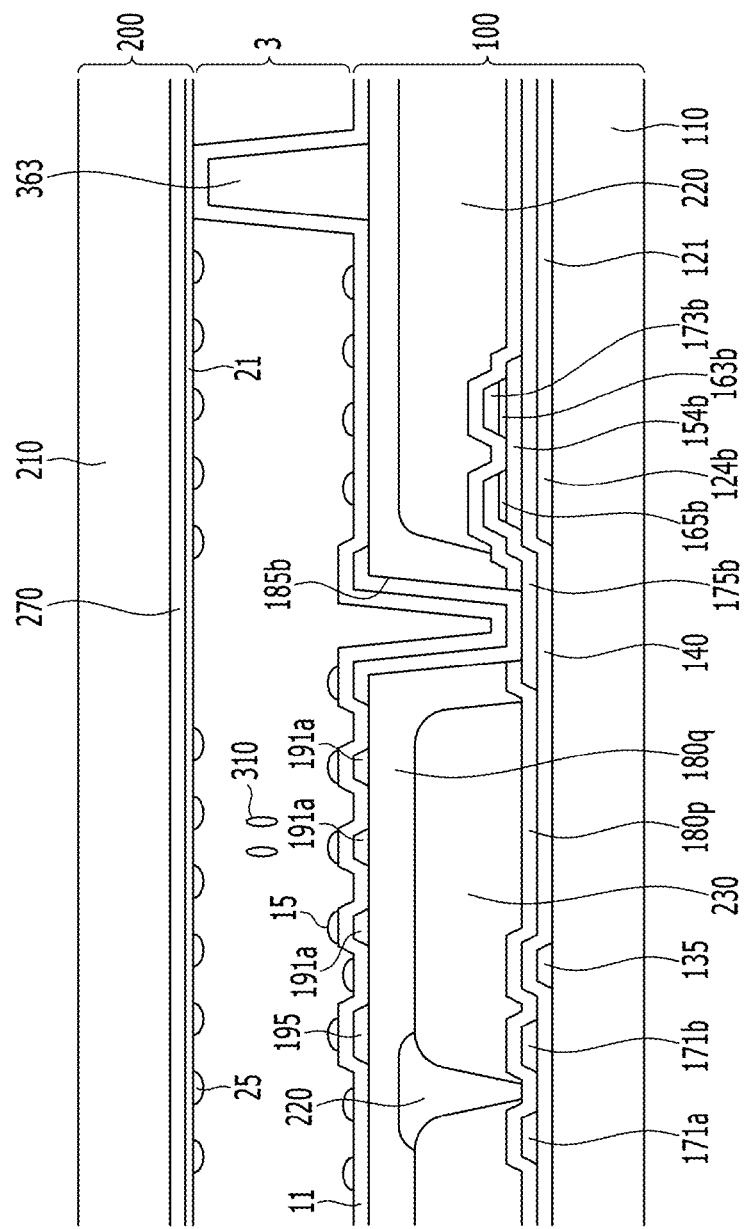
FIG. 2 is a cross-sectional view of FIG. 1, taken along the line II-II.

FIG. 1 is a top plan view of an exemplary embodiment of a liquid crystal display according to the present disclosure. FIG. 2 is a cross-sectional view of FIG. 1, taken along the line II-II.

Referring to FIG. 1 and FIG. 2, an exemplary embodiment of a liquid crystal display according the present disclosure includes a lower panel 100, an upper panel 200, and a liquid crystal layer 3. The lower panel 100 and the upper panel 200 face each other and the liquid crystal layer 3 is disposed between the two panels 100 and 200.

First, the lower panel 100 will be described.

A plurality of gate lines 121 and a plurality of storage electrode lines 131 and 135 are disposed on a first substrate 110 that serves as an insulation substrate.

The gate lines 121 transmit a gate signal and substantially extend in a horizontal direction. The gate line 121 may include a wide end portion (not shown) for connection with another layer or an external driving circuit. The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may have a multilayered structure including at least two conductive layers having different physical properties. Each gate line 121 may include a plurality of first and second gate electrodes 124a and 124b protruded therefrom.

The storage electrode lines 131 and 135 include a stem line 131 extending substantially parallel with the gate line 121 and a plurality of storage electrodes 135 extended from the stem line 131.

The shape and alignment of the storage electrode lines 131 and 135 may be variously modified.

A gate insulating layer 140 is disposed on the gate line 121 and the storage electrode lines 131 and 135, and a plurality of semiconductor layers 154a and 154b made of amorphous or crystalline silicon are disposed on the gate insulating layer 140.

A plurality of pairs of ohmic contacts may be disposed on each of the semiconductor layers 154a and 154b. In FIG. 2, ohmic contacts 163b and 165b disposed on the second semiconductor layer 154b are illustrated as an example of the plurality of pairs of ohmic contacts, but the ohmic contacts may also be disposed on the first semiconductor layer 154a. The ohmic contacts 163b and 165b may be made of a silicide or a material such as n+ hydrogenated amorphous silicon in which an n-type impurity is doped at a high concentration.

A plurality of pairs of data lines 171a and 171b and a plurality of pairs of first and second drain electrodes 175a and 175b are disposed on the ohmic contacts 163b and 165b and the gate insulating layer 140.

The data lines 171a and 171b transmit a data signal and substantially extend in a vertical direction to cross the gate lines 121 and the stem line 131. The data lines 171a and 171b include first and second source electrodes 173a and 173b which extend toward the first and second gate electrodes 124a and 124b to be curved in a U shape. The first and second source electrodes 173a and 173b face the first and second drain electrodes 175a and 175b based on the first and second gate electrodes 124a and 124b.

The first and second drain electrodes 175a and 175b extend upwards from ends which are partially surrounded by the first and second source electrodes 173a and 173b, respectively, and the opposite ends may have a wide area for connection with other layers.

However, the shapes and layouts of the data lines 171a and 171b, in addition to the first and second source electrodes 173a and 173b, and the first and second drain electrodes 175a and 175b, may be variously modified.

The first gate electrode 124a, the first source electrode 173a, and the first drain electrode 175a form a first thin film transistor ("TFT") together with the first semiconductor layer 154a. The second gate electrode 124b, the second source electrode 173b, and the second drain electrode 175b form a second thin film transistor together with the second semiconductor layer 154b. A channel of the first thin film transistor is formed in the first semiconductor layer 154a between a the first source electrode 173a and the first drain electrode 175a, and a channel of the second thin film transistor is formed in the second semiconductor layer 154b between the second source electrode 173b and the second drain electrode 175b.

The ohmic contacts 163b and 165b are disposed with the semiconductors 154a and 154b therebelow, the data lines 171a and 171b thereabove, and the drain electrodes 175a and 175b to reduce contact resistance therebetween. Exposed portions which are not covered by the data lines 171a and 171b and the drain electrodes 175a and 175b, between the source electrodes 173a and 173b and the drain electrodes 175a and 175b, exist in the semiconductors 154a and 154b.

A lower passivation layer 180p made of silicon nitride or silicon oxide is disposed on the data lines 171a and 171b, the source electrodes 173a and 173b, the drain electrodes 175a and 175b, and the exposed portions of the semiconductor layer 154a and 154b.

A color filter 230 is disposed on the lower passivation layer 180p. The color filter 230 may display primary colors, such as the three primary colors red, green, and blue. The primary colors may include red, green, and blue, or may include yellow, cyan, and magenta. Although not illustrated, the color filter may further include a color filter displaying a mix of the primary colors or white in addition to the primary colors. A light blocking member 220 formed of a single layer or a double layer of chromium and a chromium oxide or of an organic material may be disposed on the color filter 230. The light blocking member 220 may include openings arranged in a matrix format.

An upper passivation layer 180q made of a transparent organic insulating material is disposed on the color filter 230 and the light blocking member 220. The upper passivation layer 180q prevents the color filter 230 from being exposed and provides a flat surface. A plurality of contact holes 185a and 185b exposing the first and second drain electrodes 175a and 175b are formed in the lower passivation layer 180p and the upper passivation layer 180q.

A plurality of pixel electrodes 191 are disposed on the upper passivation layer 180q. The pixel electrode 191 may be made of a reflective metal such as aluminum, silver, chromium, or an alloy thereof.

Figure 4:
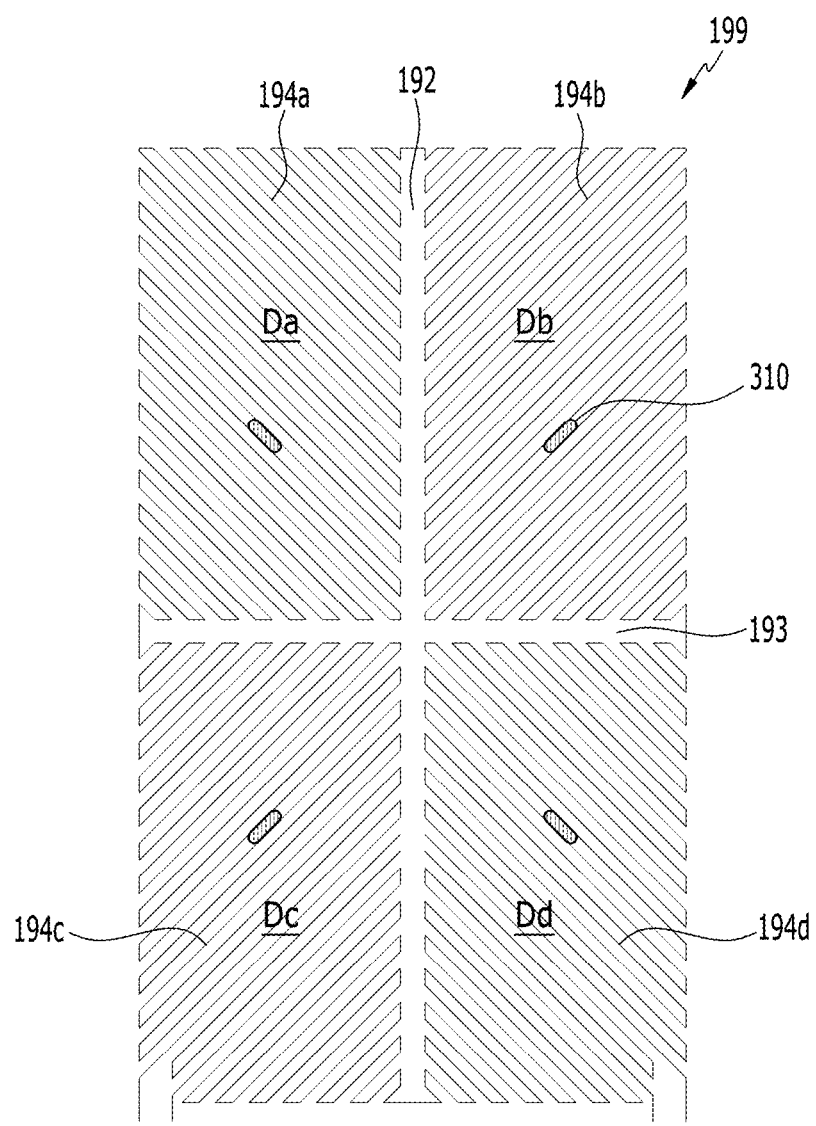
FIG. 4 is a top plan view of an exemplary embodiment of a basic electrode of the liquid crystal display accordingly to the present disclosure.

Each pixel electrode 191 includes a first sub-pixel electrode 191a and a second sub-pixel electrode 191b that are separated from each other, and each of the first and second sub-pixel electrodes 191a and 191b includes at least one of a basic electrode 199 shown in FIG. 4 or a variation of the basic electrode 199.

The structure of the pixel electrode 191 will be described with reference to FIG. 3 and FIG. 4.

Next, the upper panel 200 will be described.

A common electrode 270 is formed on the entire surface of a second substrate 210, wherein the entire surface of the substrate 210 faces to the first substrate 110.

A column spacer 363 is formed to maintain a gap between the upper panel 200 and the lower panel 100.

Alignment layers 11 and 21 are formed in inner surfaces of the lower panel 100 and the upper panel 200. As shown in FIG. 2, a lower alignment layer 11 is disposed the pixel electrode 191, and an upper alignment layer 21 is disposed on a surface of the common electrode 270, wherein the surface of the common electrode 270 faces to the pixel electrode 191. The alignment layers 11 and 21 may be vertical alignment layers. The alignment layers 11 and 21 include polymer including at least one main chain and a plurality of side chains connected to the main chain. The side chains include a vertical alignment group and at least one of a photo-reactor and a photo-reactor derivative. In the present exemplary embodiment, the photo-reactor included in the side chain serves to increase reactivity during polymerization of the reactive mesogen. The photo-reactor derivative is formed by polymerizing the photo-reactor with the reactive mesogen.

The photo-reactor may use various materials that can generate a radical by absorbing light so as to initiate polymerization.

In an exemplary embodiment, the lower alignment layer 11 may substantially cover the column spacer 363 with a uniform thickness.

In an exemplary embodiment, bumps 15 and 25 are formed in the surface of the alignment layers 11 and 21

The bumps 15 and 25 may be formed by light irradiation of the reactive mesogen, which is an alignment agent included in the liquid crystal layer 3. In an exemplary embodiment, the bumps 15 and 25 include an alignment polymer having a pre-tilt. The alignment polymer may be formed by light irradiation of the reactive mesogen included in the liquid crystal layer 3. Alternatively, the alignment polymer may be formed by light irradiation after the reactive mesogen, which is mixed in the alignment material that forms the alignment layers 11 and 21, is eluted to the liquid crystal layer 30 during a baking process.

In an exemplary embodiment, the alignment layers 11 and 21 included in the liquid crystal layer are made of polyimide including a main chain and a plurality of side chains connected to the main chain. Hereinafter, the polyimide will be described in detail.

In an exemplary embodiment, the polyimide includes a first structural unit represented by Chemical Formula 1, a second structural unit represented by Chemical Formula 2, and a third structural unit represented by Chemical Formula 3.

[Chemical Formula 1]

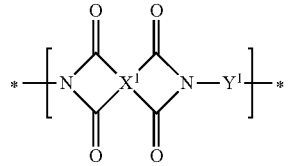

[Chemical Formula 2]

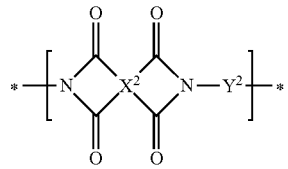

[Chemical Formula 3]

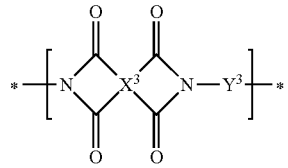

In Chemical Formula 1 to Chemical Formula 3, $X^1$, $X^2$, and $X^3$ respectively denote a tetravalent or pentavalent organic group independently formed from alicyclic acid dianhydride or aromatic acid dianhydride;

$Y^1$ is a divalent organic group induced from aromatic diamine, and at least one hydrogen of the divalent organic group is substituted with a substituted or unsubstituted C5 to C30 linear or branched alkyl group (where, non-neighboring $CH_2$ groups of the substituted C5 to C30 linear or branched alkyl group, may be a substituted with —O—, —N($R^a$)—, —C(=O)O—, —C(=O)N($R^b$)—, —N($R^c$)C(=O)—, or —OC(=O)— in which, $R^a$, $R^b$, and $R^c$ are respectively hydrogen or a substituted or unsubstituted C1 to C8 alkyl group);

$Y^2$ is a divalent organic group induced from aromatic diamine and at least hydrogen of the divalent organic group are substituted as given in Chemical Formula 2A; and $Y^3$ is a divalent organic group induced from aromatic diamine, and at least one hydrogen of the divalent organic group is substituted as given in Chemical Formula 3A or Chemical Formula 3B.

[Chemical Formula 2A]

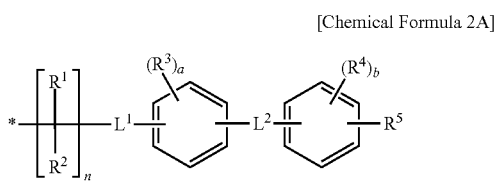

In Chemical Formula 2A, $R^1$ to $R^4$ are independently a hydrogen or a substituted or unsubstituted C1 to C8 alkyl group;

n is an integer from 0 to 20;

$R^5$ is a substituted or unsubstituted C1 to C30 alkyl group;

a and b are each independently an integer from 0 to 4; and $L^1$ and $L^2$ are each independently a single bond, —O—, —S(=O)$_2$—, or —(C($R^x$)($R^y$))$_m$—, where, $R^x$ and $R^y$ are each independently a hydrogen atom or a substituted or unsubstituted C1 to C8 alkyl group, and m is an integer from 1 to 20.

[Chemical Formula 3A]

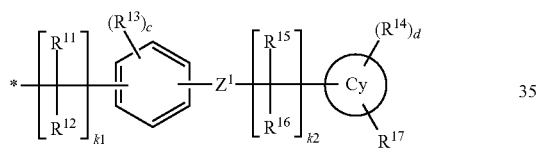

[Chemical Formula 3B]

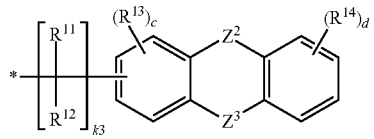

In Chemical Formula 3A and Chemical Formula 3B,

Cy is an aryl group of C6 to C18 or a cycloalkyl group of C6 to C18;

$R^{11}$ to $R^{14}$ are independently a hydrogen or a substituted or unsubstituted C1 to C8 alkyl group;

$R^{15}$ and $R^{16}$ are independently a hydroxy group or a substituted or unsubstituted C1 to C8 alkoxy group;

$R^{17}$ is hydrogen, a hydroxy group, or a substituted or unsubstituted C1 to C8 alkoxy group;

c and d are independently an integer of 0 to 4;

k1 and k3 are integers of 0 to 20 and k2 is an integer of 0 to 5;

$Z^1$ and $Z^2$ are respectively independently —C(=O)—; and $Z^3$ is —S— or —C(=O)—.

In an exemplary embodiment, the photo-reactor may be represented by Chemical Formula 3A-1 or Chemical Formula 3B-1, and the photo-reactor derivative may be a derivative of the photo-reactor represented by Chemical Formula 3A-1 or Chemical Formula 3B-1:

Chemical Formula 3A-1

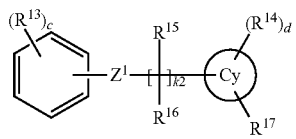

Chemical Formula 3B-1

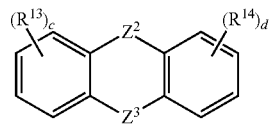

where, in Chemical Formula 3A-1 and Chemical Formula 3B-1, Cy is a C6 to C18 aryl group of or a C6 to C18 cycloalkyl group; $R^{13}$ to $R^{14}$ are independently hydrogen or a substituted or unsubstituted C1 to C8 alkyl group; $R^{15}$ and $R^{16}$ are independently a hydroxy group or a substituted or unsubstituted C1 to C8 alkoxy group; $R^{17}$ is hydrogen, a hydroxy group, or a substituted or unsubstituted C1 to C8 alkoxy group; c and d are respectively independently integers of 0 to 4; k2 is an integer of 0 to 5; $Z^1$ and $Z^2$ are respectively independently —C(=O)—; and $Z^3$ is —S— or —C(=O)—.

In an exemplary embodiment, the polyimide forming the alignment layer can be represented as shown below in Chemical Formula A. This is only one example of the polyimide and can be variously modified.

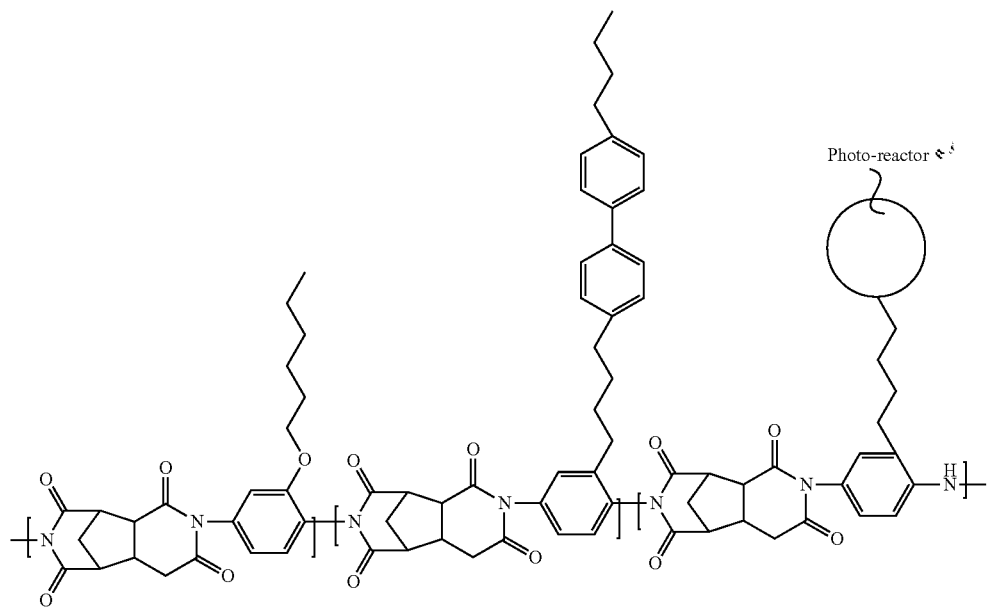

Chemical Formula A

In Chemical Formula A, the photo-reactor may be a compound having a chemical structure as shown in Table 1.

TABLE 1

| Photo-reactor | Max UV Absorption wavelength (nm) |
|---|---|
| (thioxanthone with R groups) | 365 |
| (benzophenone ketal with OR groups) | 25 340 |
| (1-hydroxycyclohexyl phenyl ketone) | 246 280 333 |
| (benzophenone) | 251 |

TABLE 1-continued

| Photo-reactor | Max UV Absorption wavelength (nm) |
|---|---|
| (anthraquinone with R and methyl groups) | 257 |

In an exemplary embodiment, the alignment layers of the present disclosure may be formed by performing a coating and baking process on the liquid crystal alignment agent.

In an exemplary embodiment, the liquid crystal alignment agent includes a first structural unit represented by Chemical Formula 1 and including a substituted or unsubstituted C5 to C30 linear or branched alkyl group, a second structural unit represented by Chemical Formula 2 and including a substituent as shown in Chemical Formula 2A which induces vertical alignment, and a third structural unit represented by Chemical Formula 3 and including a substituent as shown in Chemical Formula 3A or Chemical Formula 3B, which can induce generation of radicals through light absorption.

The second structural unit represented by Chemical Formula 2A includes a vertical alignment component and may be a side chain of Chemical Formula 2A in the liquid crystal alignment agent. A side chain represented as by the structure in Chemical Formula 3A or Chemical Formula 3B may generate radicals when subjected to irradiation with ultraviolet (UV) light. Specifically, an end portion of the side chain having a structure represented as given in Chemical Formula 3A or Chemical Formula 3B may include a photo-reactor. In an exemplary embodiment, the photo-reactor may include at least one of the components having a structure represented by Chemical Formula 3-1, Chemical Formula 3-2, Chemical Formula 3-3, Chemical Formula 3-4, and Chemical Formula 3-5.

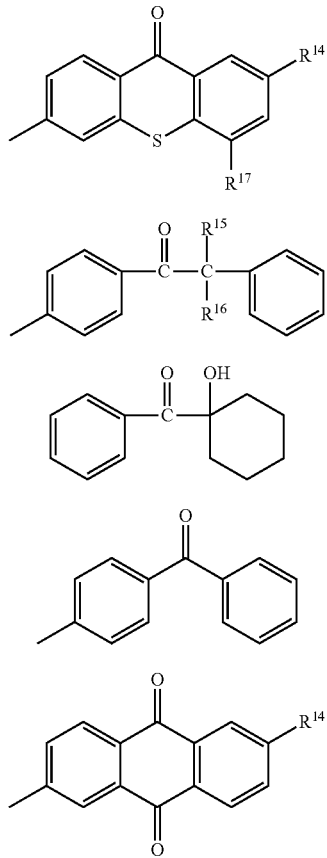

[Chemical Formula 3-1]

[Chemical Formula 3-2]

[Chemical Formula 3-3]

[Chemical Formula 3-4]

[Chemical Formula 3-5]

In Chemical Formula 3-1, Chemical Formula 3-2, and Chemical Formula 3-5, $R^{14}$ is independently hydrogen or a substituted or unsubstituted C1 to C8 alkyl group; $R^{15}$ and $R^{16}$ are respectively independently a hydroxy group or a substituted or unsubstituted C1 to C8 alkoxy; $R^{17}$ is hydrogen, a hydroxy group or a substituted or unsubstituted C1 to C8 alkoxy group; c and d are each independently an integer of 0 to 4; k2 is an integer of 0 to 5; $Z^1$ and $Z^2$ are respectively independently —C(=O)—; and $Z^3$ is —S— or —C(=O)—.

In an exemplary embodiment, the photo-reactor eliminates reactive mesogen from reacting with residual non-reacted reactive mesogen that is in the liquid crystal. As a result, a direct current (DC) afterimage can be minimized. In addition, the size of the bumps in the alignment layer manufactured using the exemplary liquid crystal alignment agent is reduced and bump density is minimized, thereby assuring stability of a pre-tilt angle and minimizing an AC afterimage. In addition, the side chains represented by Chemical Formula 3A or Chemical Formula 3B include a photo-reactive substituent at the end thereof so that photo-reaction speed can be increased, and reliability of the element improved. Compared to polyimide that does not include the photo-reactive substituent, processing time can be shortened in manufacturing the liquid crystal alignment layer, thereby improving productivity and reducing costs.

Polyimide is manufactured by imidizing polyamic acid formed by copolymerizing at least one acid dianhydride and an aromatic diamine. The acid dianhydride is selected from alicyclic acid dianhydride and aromatic acid dianhydride. As a method of manufacturing the polyamic acid, any method known to be capable of synthesizing of the polyamic acid may be applied without limitation.

The alicyclic acid dianhydride may be at least one selected from 1,2,3,4-cyclobutanetetracarboxylic acid dianhydride ("CBDA"), 2,3,4,5-tetrahydrofuran tetracarboxylic acid dianhydride, 5-(2,5-dioxotetrahydrofuryl)-3-methylcyclohexane-1,2-dicarboxylic anhydride ("DOCDA"), bicyclooctene-2,3,5,6-tetracarboxylic acid dianhydride ("BODA"), 1,2,3,4-cyclopentanetetracarboxylic dianhydride ("CPDA"), 1,2,4,5-cyclohexanetetracarboxylic acid dianhydride ("CHDA"), 1,2,4-tricarboxy-3-methylcarboxy cyclopentane dianhydride, 3,4-dicarboxy-1-cyclohexyl succinic acid dianhydride, 3,4-dicarboxy-1,2,3,4-tetrahydro-1-naphthalenesuccinic acid dianhydride, and 2,3,5-tricarboxycyclopentyl acetic dianhydride ("TCA-AH"), but it is not limited thereto.

The aromatic acid dianhydride may be at least one selected from pyromellitic acid dianhydride ("PMDA"), biphthalic acid anhydride ("BPDA"), oxydiphthalic acid dianhydride ("ODPA"), benzophenone tetracarboxylic acid dianhydride ("BTDA") and 4,4'-(hexafluoroisopropylidene) diphthalic dianhydride ("6-FDA"), but it is not limited thereto.

In an exemplary embodiment, the liquid crystal alignment agent t may include a solvent for dissolving the polyimide. The solvent may be included to obtain the liquid crystal photo-alignment agent having excellent spreadability and adhesion with a substrate.

Examples of the solvent may include N-methyl-2-pyrrolidone; N,N-dimethyl acetamide; N,N-dimethyl formamide; dimethyl sulfoxide; γ-butyrolactone; tetrahydrofuran ("THF"); and a phenol-based solvent such as meta-cresol, phenol, and halogenated phenol, but it is not limited thereto.

In an exemplary embodiment, the solvent may further include 2-butyl cellosolve ("2-BC"), and accordingly, the printing property can be improved. In this case, 2-butyl cellosolve may be included in an amount of about 1 wt % to about 50 wt % with respect to the total solvent content, and specifically, may be included in an amount of about 10 wt % to about 40 wt %. When 2-butyl cellosolve is included in the above-stated range, the printing property can be improved.

The solvent may further include one or more of alcohols, ketones, esters, ethers, hydrocarbons, or halogenated hydrocarbons that are a poor solvent, and at an appropriate amount within a range where the soluble polyimide copolymer polymer is not precipitated. The poor solvents may reduce surface energy of the liquid crystal alignment agent to improve spreadability and flatness of the liquid crystal alignment agent during application.

The poor solvent may be included in an amount of about 1 wt % to about 90 wt %, and specifically about 1 wt % to about 70 wt %, based on the total amount of the solvent. A specific example of the poor solvent may be any one selected from methanol, ethanol, isopropanol, cyclohexanol, ethyleneglycol, propylene glycol, 1,4-butanediol, triethylene glycol, acetone, methylethylketone, cyclohexanone, methyl acetate, ethyl acetate, butyl acetate, diethyl oxalate, malonic acid ester, diethylether, ethyleneglycol monomethylether, ethyleneglycol dimethylether, ethyleneglycol monoethylether, ethyleneglycol phenylether, ethyleneglycol phenylmethylether, ethyleneglycol phenylethylether, diethyleneglycol dimethylether, diethyleneglycol ether, diethyleneglycol monomethylether, diethyleneglycol monoethylether, diethyleneglycol monomethylether acetate, diethyleneglycol monoethylether acetate, ethyleneglycol methylether acetate, ethyleneglycol ethylether acetate, 4-hydroxy-4-methyl-2-pentanone, 2-hydroxyethyl propionate, 2-hydroxy-2-methylethyl propionate, ethoxyethyl acetate, hydroxyethyl acetate, 2-hydroxy-3-methylmethyl butanoate, 3-methoxymethyl propionate, 3-methoxyethyl propionate, 3-ethoxyethyl propionate, 3-ethoxymethyl propionate, methylmethoxy butanol, ethylmethoxy butanol, methylethoxy butanol, ethylethoxy butanol, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene, and a combination thereof may be used.

In an exemplary embodiment, the liquid crystal alignment agent forming the alignment layers 11 and 21 according to the present disclosure, may further include other additives.

Examples of the other additives may include an epoxy compound. The epoxy compound is used to improve reliability and an electro-optic property. One or more types of epoxy compounds including two to eight epoxy groups, and specifically, two to four epoxy groups, may be used.

The epoxy compound may be included in the amount of about 0.1 to about 50 parts by weight, and specifically, about 1 to about 30 parts by weight based on 100 parts by weight of the polyimide copolymer. When the epoxy compound is included in an amount within the aforementioned range, the liquid crystal photo-alignment agent may exhibit appropriate printing properties and flatness during application on the substrate and may easily improve the reliability and the electro-optic properties.

Specific examples of the epoxy compound may include N,N,N',N'-tetraglycidyl-4,4'-diaminophenylmethane ("TGDDM"), N,N,N',N'-tetraglycidyl-4,4'-diaminophenylethane, N,N,N',N'-tetraglycidyl-4,4'-diaminophenylpropane, N,N,N',N'-tetraglycidyl-4,4'-diaminophenylbutane, N,N,N',N'-tetraglycidyl-4,4'-diaminobenzene, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerine diglycidyl ether, 2,2-dibromoneopentylglycoldiglycidylether, 1,3,5,6-tetraglycidyl-2,4-hexandiol, N,N,N',N'-tetraglycidyl-1,4-phenylenediamine, N,N,N',N'-tetraglycidyl-m-xylenediamine, N,N,N',N'-tetraglycidyl-2,2'-dimethyl-4,4'-diaminobiphenyl, 2,2-bis[4-(N,N-diglycidyl-4-aminophenoxy)phenyl]propane, N,N,N',N'-tetraglycidyl-4,4'-diaminodiphenylmethane, 1,3-bis(N,N-diglycidylaminomethyl)cyclohexane, 1,3-bis(N,N-diglycidylaminomethyl)benzene, and the like, but are not limited thereto.

Further, in order to improve a printing property, an appropriate surfactant or coupling agent may be used as the additive.

In an exemplary embodiment, the alignment layers 11 and 21 may be formed by coating the liquid crystal alignment agent on the substrate. Methods for coating the liquid crystal alignment agent on the substrate include, a spin coating method, a flexographic printing method, an inkjet printing method, and the like. Among the methods, the flexographic printing method may be used because uniformity of the formed coat is excellent and it is easy to perform enlargement.

In order to improve uniformity of the formed coat, the liquid crystal alignment agent is uniformly spread on the substrate and then temporarily dried at a temperature of room temperature (RT) to about 200° C., specifically about 30° C. to about 150° C., and more specifically about 40° C. to about 120° C., for a time period of about 1 to about 100 minutes. The uniform coat having no deviation may be obtained by adjusting the volatility of each component in the liquid crystal alignment agent through the temporary drying.

After that, the formed coat is fired at a temperature of about 80° C. to about 300° C., and specifically about 120° C. to about 280° C., for a time of about 5 to about 300 minutes, in order to evaporate the solvent, thereby forming the alignment layers 11 and 21.

In addition, a polarizer (not shown) may be provided in the outer surface of the lower panel 100 and the upper panel 200.

Referring to FIG. 1 and FIG. 2, a liquid crystal layer 3 including liquid crystal molecules 310, is disposed between the lower panel 100 and the upper panel 200.

The liquid crystal molecules 310 have negative dielectric anisotropy, and long axes of the liquid crystal molecules 310 are substantially vertical to the surfaces of the two panels 100 and 200 while an electric field is not applied (i.e. in the absence of an electric field).

The alignment polymer included in the bumps 15 and 25, which are formed by exposing the reactive mesogen to light irradiation, serves to control pre-tilt of the liquid crystal material. Pre-tilt is the initial alignment direction of the liquid crystal material 310. Here, the photo-reactor included in the side chain of the liquid crystal alignment agent increases a polymerization reactivity of the reactive mesogen and assists the reactive mesogen to form the bumps 15 and 25. Also, the photo-reactor reacts with a remaining reactive mesogen, which is not reactive to light irradiation, to remove the remaining reactive mesogen.

Figure 3:
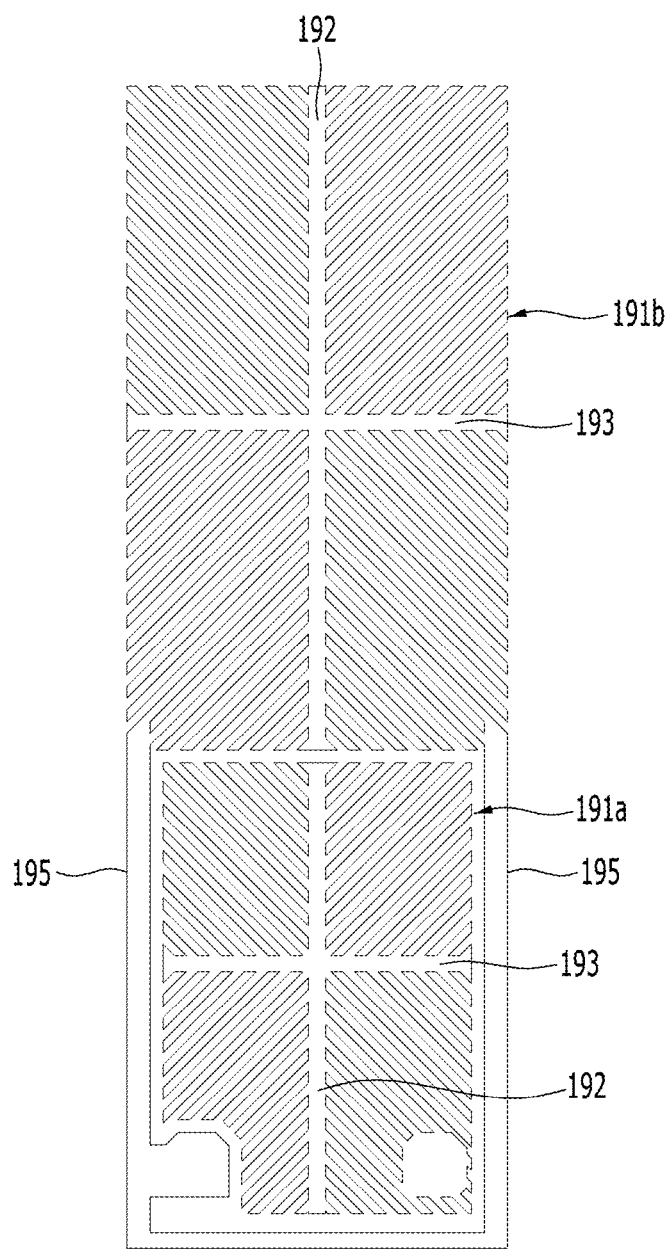
FIG. 3 is a top plan view of an exemplary embodiment of a pixel electrode according to the present disclosure.

FIG. 3 is a top plan view of an exemplary embodiment of a pixel electrode according to the present disclosure. FIG. 4 is a top plan view of an exemplary embodiment of a basic electrode according to the present disclosure.

Referring to FIG. 4, a basic electrode 199 will be more specifically described.

As shown in FIG. 4, the entire shape of the basic electrode 199 is a quadrangle, and includes a cross stem configured from a horizontal stem 193 and a vertical stem 192 perpendicular to the horizontal stem 193. Further, the basic electrode 199 is divided into a first sub-region Da, a second sub-region Db, a third sub-region Dc, and a fourth sub-region Dd which are divided based on the horizontal stem 193 and the vertical stem 192, and the respective sub-regions Da-Dd include a plurality of first minute branches 194a, a plurality of second minute branches 194b, a plurality of third minute branches 194c, and a plurality of fourth minute branches 194d.

The first minute branches 194a extend obliquely in an upper left direction from the horizontal stem 193 or the vertical stem 192, and the second minute branches 194b extend obliquely in an upper right direction from the horizontal stem 193 or the vertical stem 192. Further, the third minute branches 194c extend obliquely in a lower left direction from the horizontal stem 193 or the vertical stem 192, and the fourth minute branches 194d extend obliquely in a lower right direction from the horizontal stem 193 or the vertical stem 192.

The first to fourth minute branches 194a, 194b, 194c, and 194d form an angle of about 45 to 135 degrees with the gate line 121 or the horizontal stem 193. In addition, minute branches 194a, 194b, 194c, and 194d of neighboring two sub-regions Da, Db, Dc, and Dd may perpendicularly cross each other.

The width of the minute branches 194a to 194d may be about 2.0 micrometers (µm) to about 5.0 µm, and a gap between neighboring minute branches 194a to 194d in one sub-region Da to Dd may be about 2.5 µm to about 5.0 µm.

Although not illustrated, the width of the minute branches 194a, 194b, 194c, and 194d may gradually widen closer to the horizontal stem 193 or the vertical stem 192.

Referring to FIG. 1 to FIG. 3, first and second sub-pixel electrodes 191a and 191b respectively include one basic electrode 199 shown in FIG. 4 or a variation of the basic electrode 199. However, across the entire pixel electrode 191, the area occupied by the second sub-pixel electrode 191b may be greater than the area occupied by the first sub-pixel electrode 191a, and in this case, the size of the basic electrode 199 of the second sub-pixel electrode 191b may be controlled to make the area of the second sub-pixel electrode 191b about 0.1 times to about 2.2 times greater than the area of the first sub-pixel electrode 191a.

The second sub-pixel electrode 191b includes a pair of branches 195 extending along the data line 171. The pair of branches 195 are disposed between the first sub-pixel electrode 191a and the data lines 171a and 171b, and are connected to each other at a lower end of the first sub-pixel electrode 191a. The first and second sub-pixel electrodes 191a and 191b are physically and electrically connected with the first and second drain electrodes 175a and 175b through contact holes 185a and 185b (see FIG. 1) such that a data voltage is applied thereto from the first and second drain electrodes 175a and 175b.

When voltages are applied to the pixel electrode 191 and the common electrode 270, the long axes of the liquid crystal molecules 310 change direction to be perpendicular to the direction of the electric field in response to the electric field formed between the pixel electrode 191 and the common electrode 270. A change in the degree of polarization of the light passing through the liquid crystal layer 3, varies according to the tilted degree of the liquid crystal molecules 310. The change in the polarization is represented by a change in the transmittance of light by a polarizer, and as a result, each pixel displays a predetermined desired luminance.

The tilt direction of the liquid crystal molecules 310 is determined by the minute branches 194a, 194b, 194c, 194d of the pixel electrode 191. That is, the liquid crystal molecules 310 are tilted in a direction that is parallel to the length direction of the minute branches 194a, 194b, 194c, and 194d. Since one pixel electrode 191 includes four sub-regions Da, Db, Dc, and Dd in which the length direction of the minute branches 194a, 194b, 194c, and 194d are different from each other, the tilt direction of the liquid crystal molecules 310 includes four directions and four domains in which the alignment direction of the liquid crystal molecules 310 in the liquid crystal layer 3 differ from each other. Thus, a viewing angle of the liquid crystal display can be enhanced by varying tilt directions of the liquid crystal molecules.

The description of the thin film transistors and the pixel electrode 191 described above is one example, and the structure of the thin film transistors and the design of the pixel electrode may be modified to enhance side visibility. For example, an RD-TFT structure capable of improving visibility may be formed by using a voltage differential effect generated for each region according to distribution of resistance.

Surface Morphology of Alignment Layer

Figure 5:
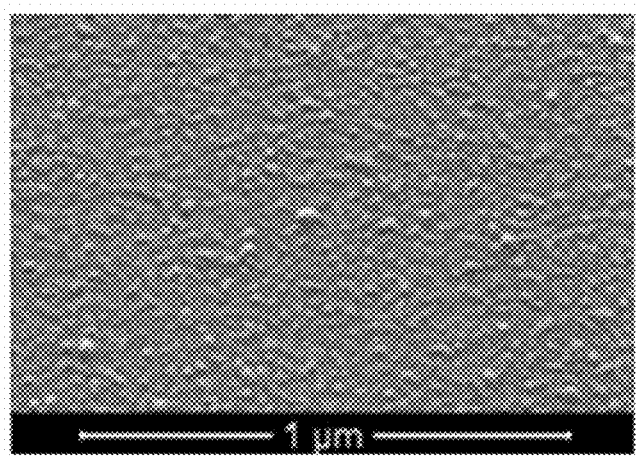
FIG. 5 is a scanning electron microscope (SEM) photograph of an exemplary embodiment of an alignment layer manufactured with a liquid crystal alignment agent according to the present disclosure.
Figure 6:
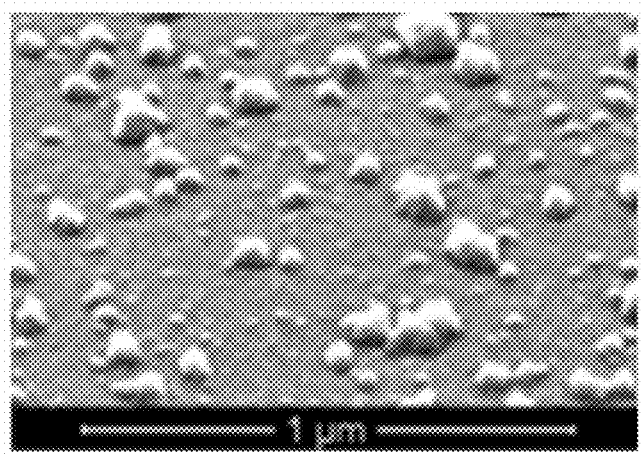
FIG. 6 is an SEM photo of an alignment layer according to a Comparative Example.

FIG. 5 is a scanning electron microscope (SEM) photograph of an alignment layer manufactured with the exemplary liquid crystal alignment agent according to the present disclosure, and FIG. 6 is an SEM photo of an alignment layer (Comparative Example) manufactured with a liquid crystal alignment agent that does not include a polyimide have a photo-reactor side chain represented by Chemical Formula 3. Specifically, the Comparative Example corresponds to an alignment layer including the first and second structural units represented by Chemical Formula 1 and Chemical Formula 2, but not the third structural unit represented by Chemical Formula 3.

As shown in FIG. 5, it can be observed that, for the exemplary embodiment of the alignment layer, the bump size is reduced and the bump density is increased while the uniformity of the alignment layer is excellent Compared to the exemplary embodiment of the alignment layer, as shown in FIG. 6, for the alignment layer according to the Comparative Example, the bump size is large and the bump density is relatively low, while the uniformity of the layer is deteriorated.

Afterimage Evaluation

Figure 7:
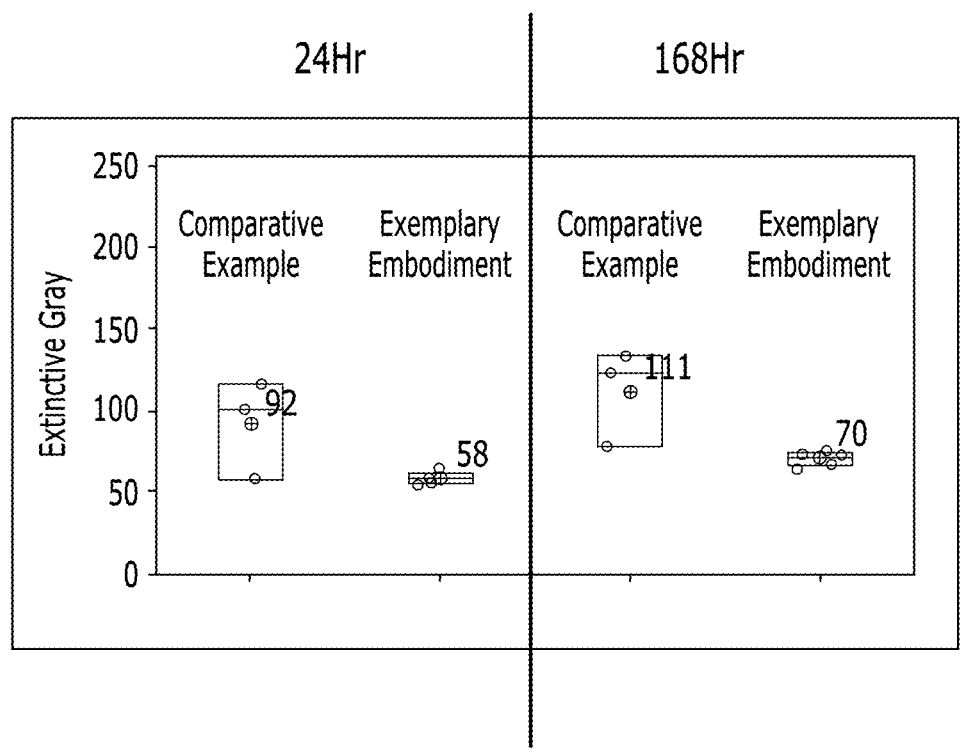
FIG. 7 is a graph illustrating the afterimages (effective gray) over time (24 or 168 hours) of liquid crystal displays respectively including an exemplary embodiment of an alignment layer or an alignment layer according to a Comparative Example.

FIG. 7 is a graph illustrating the afterimages (effective gray) over time (24 hours or 168 hours) of liquid crystal displays respectively including the Exemplary Embodiment alignment layer and the Comparative Example alignment layer. A black-white check pattern was formed over a period of 24 hours or a period of 168 hours.

As shown in FIG. 7, in a case where a black/white check pattern is formed for 24 hours and in a case where a black/white check pattern is formed for 168, the degree of afterimage is significantly lower in the Exemplary Embodiment of the present disclosure as compared to the Comparative Example.

Hereinafter, an exemplary embodiment of a liquid crystal display which is a variation of the exemplary embodiment of FIG. 1 to FIG. 4, will be described with reference to FIG. 8.

Figure 8:
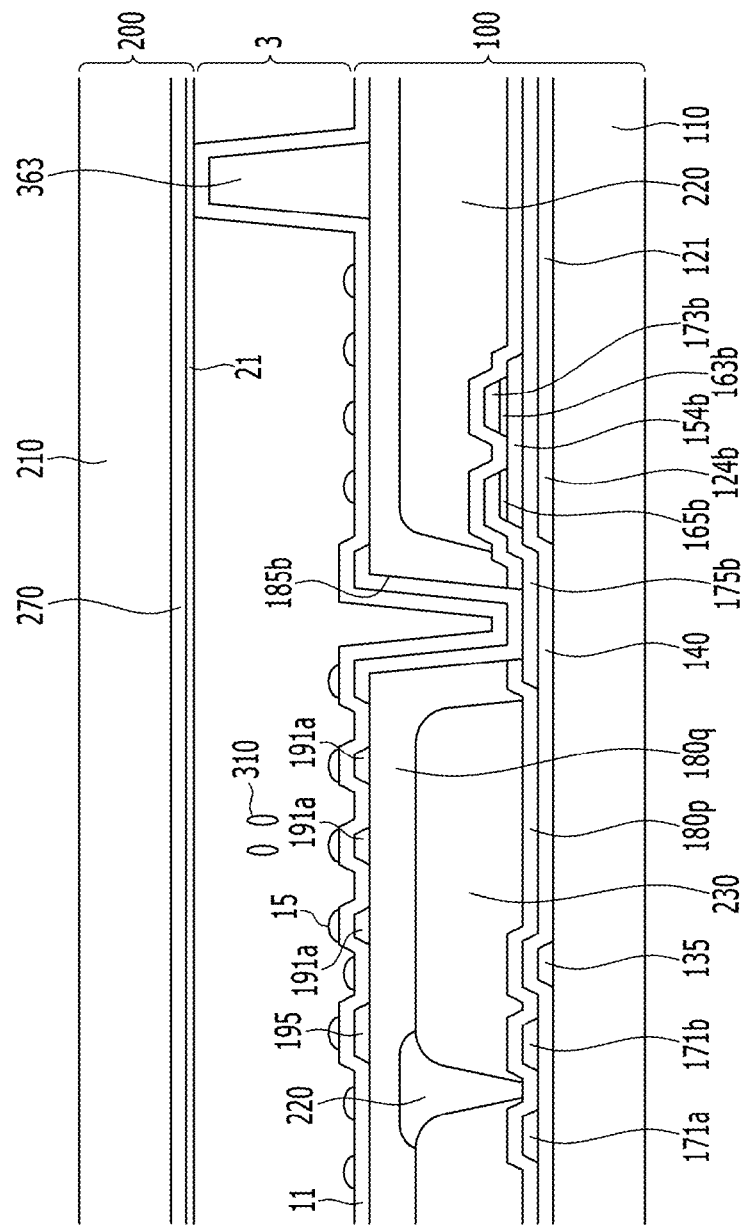
FIG. 8 is a cross-sectional view of an exemplary embodiment of a liquid crystal display according to the present disclosure.

Unlike the exemplary embodiment of FIG. 2 shown as having a structure in which the bumps 15 and 25 may be formed both between the lower alignment layer 11 and the liquid crystal layer 3 and between the upper alignment layer 21 and the liquid crystal layer 3, bumps 15 of the exemplary embodiment of FIG. 8 may be formed only on the lower alignment layer 11. However, unlike those illustrated in FIG. 8, the bumps may also be formed on an upper alignment layer 21, and in this case, the number of bumps may be significantly fewer than the number of bumps 15 formed on the lower alignment layer 11. Specifically, when the bump density corresponds to the number of bumps per each unit area, the density of bumps located on the lower alignment layer 11 is greater than density of bumps located on the upper alignment layer 21. In this case, the size of the bumps located on the lower alignment layer 11 may be smaller than the size of bumps located on the upper alignment layer 21.

The density of the bumps on the lower panel 100 and the density of the bumps on the upper panel 200 are set to be different from each other such that a pre-tilt of the liquid crystal molecules 310 that are adjacent to the lower alignment layer 11 and a pre-tilt of the liquid crystal molecules 310 that are adjacent to the upper alignment layer 21, may be set to be different from each other. In order to for the density of bumps on the lower panel 100 and the density of bumps on the upper panel 200 to be different from each other, the lower alignment layer 11 may be manufactured from the liquid crystal alignment agent including the first, second, and third structural units, while the upper alignment layer 21 may be manufactured from the liquid crystal alignment agent including only the first and second structural units of the exemplary embodiments of FIG. 1 to FIG. 4.

Since the lower alignment layer 11 includes the third structural unit including the photo-reactor, polymerization of the reactive mesogen included in the liquid crystal layer 3 is increased when the liquid crystal layer is exposed to an electric field exposure. Thus, the density of the bumps located on the lower alignment layer 11 increases so that the pre-tilt of the liquid crystal molecules 310 that are adjacent to the lower alignment layer 11, may be greater than a pre-tilt of the liquid crystal molecules 310 that are adjacent to the upper alignment layer 21. For example, the liquid crystal molecules 310 that are adjacent to the lower alignment layer 11 may have a pre-tilt angle of greater than or equal to 80 degrees and less than 89 degrees with respect to the surface of the lower alignment layer 11, while the liquid crystal molecules 310 that are adjacent to the upper alignment layer 21 may have a pre-tilt angle that is substantially perpendicular to the surface of the upper alignment layer 21, that is, a pre-tilt angle of greater than or equal to 89 degrees or less than or equal to 90 degrees. In an exemplary embodiment, the pre-tilt refers to the obliqueness with respect to a direction substantially perpendicular to the surface of the lower alignment layer 11 and the upper alignment layer 21.

Next, a problem regarding the occurrence of a dark portion such as a texture in a conventional liquid crystal display having a curved liquid crystal display panel will be described with reference to FIG. 9 and FIG. 10.

Figure 9:
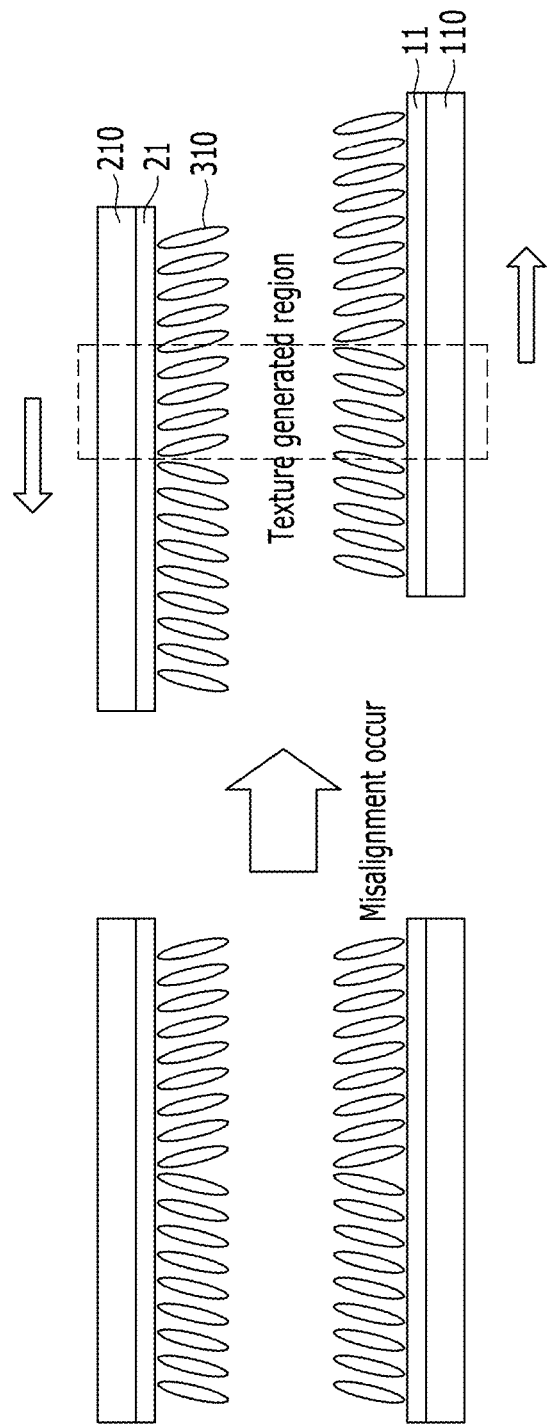
FIG. 9 is an illustration of a texture failure in a liquid crystal display of the prior art.

FIG. 9 is an illustration of a texture failure in a liquid crystal display of the prior art (i.e. the liquid crystal molecules adjacent to the upper and lower alignment layers have the same pre-tilt). FIG. 10 shows simulation of a texture failure in a prior art crystal display.

Figure 10:
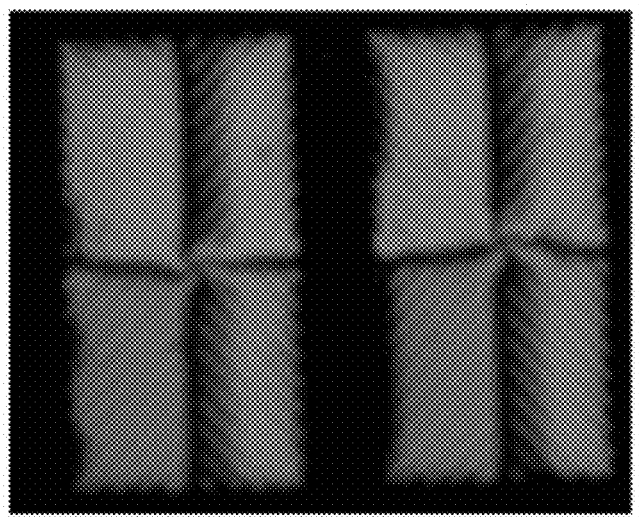
FIG. 10 shows simulation of a texture failure in the prior art liquid crystal display.

Referring to FIG. 9 and FIG. 10, liquid crystal molecules 310 between a first alignment layer 11 and a second alignment layer 21 have a tilt-angle formed in the same direction. When a display panel is bent to form a curved liquid crystal display, the alignment of the liquid crystal molecules 310 between the first substrate 110 and the second substrate 210 is changed, and thus a region is formed in which there is a mismatch between a pre-tilt direction of the liquid crystal molecules 310 at the first alignment layer 11 and a pre-tilt direction of the liquid crystal molecules 310 at the second alignment layer 21. In this region, a problem occurs in directions in which the liquid crystal molecules 310 are inclined such that a texture failure occurs.

Figure 11:
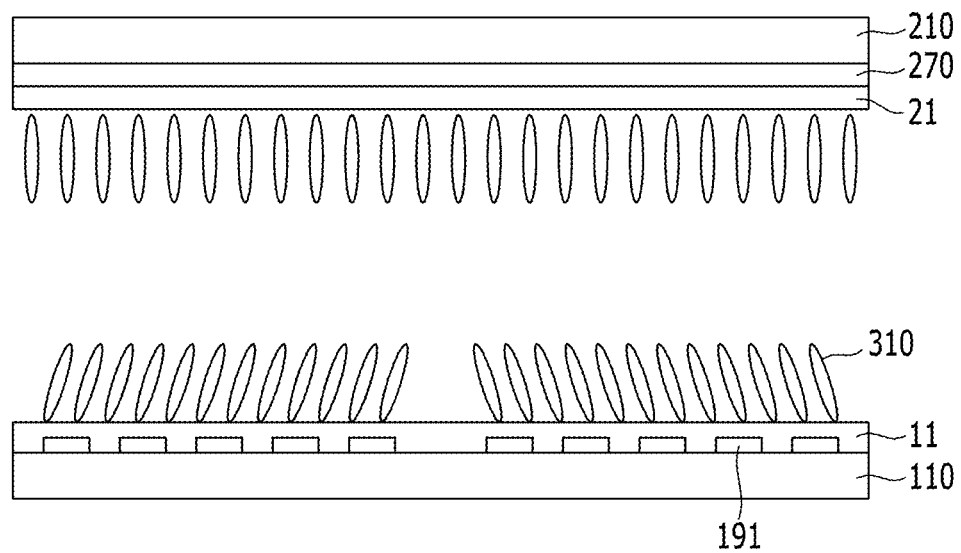
FIG. 11 is an illustration showing the alignment of liquid crystal molecules that are adjacent to upper and lower alignment layers in the liquid crystal display in accordance with the exemplary embodiment of FIG. 8.
Figure 12:
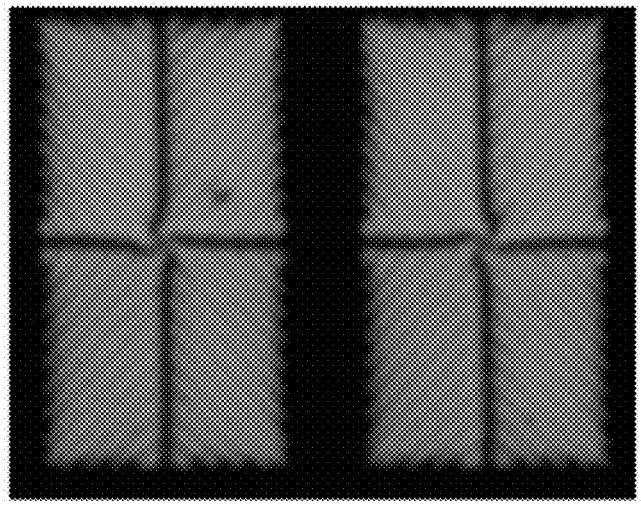
FIG. 12 shows a simulation of a texture image of an exemplary embodiment of the liquid crystal display.
Figure 15:
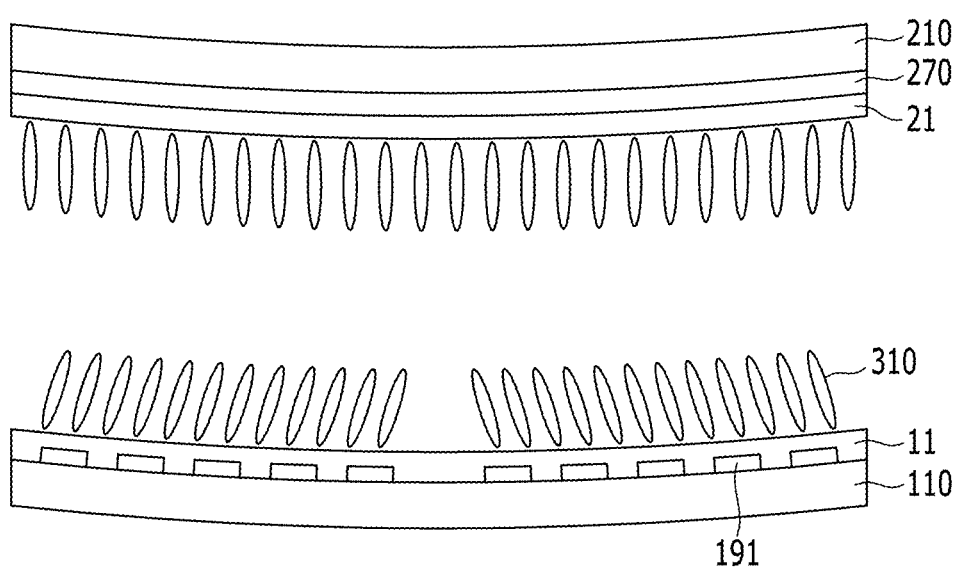
FIG. 15 is an illustration of an exemplary embodiment of a display panel according to the exemplary embodiment of FIG. 11 which is bent to form a curved liquid crystal display.

FIG. 11 is an illustration showing the alignment of liquid crystal molecules 310 that are adjacent to upper and lower alignment layers in the exemplary embodiment of the liquid crystal display of FIG. 8. FIG. 15 is an illustration of a display panel bent to form a curved liquid crystal display from the liquid crystal display according to the exemplary embodiment of FIG. 11. Referring to FIG. 15, the first substrate 110 and the second substrate 210 may be bent to have curved sides. FIG. 12 shows a simulation of a texture image of the exemplary embodiment of the liquid crystal display.

Referring to FIG. 11, unlike the liquid crystal display of FIG. 9 and FIG. 10, for the liquid crystal display of FIG. 8, the pre-tilt of the liquid crystal molecules 310 located adjacent to the first alignment layer 11 and the pre-tilt of the liquid crystal molecule 310 located adjacent to the second alignment layer 21 are set to be different from each other. As a result, referring to FIG. 15, a texture region may not be generated in the boundary of the domain regions that neighbor each other even though the display panel is bent to form a curved liquid crystal display. Referring to FIG. 12, textures are significantly reduced in the boundary of neighboring domain regions compared to FIG. 10.

Hereinafter, an exemplary embodiment of a method for manufacturing the above-described liquid crystal display will be described with reference to FIG. 13 and FIG. 14. The manufacturing method is not limited thereto, and may be modified in another form.

Figure 13:
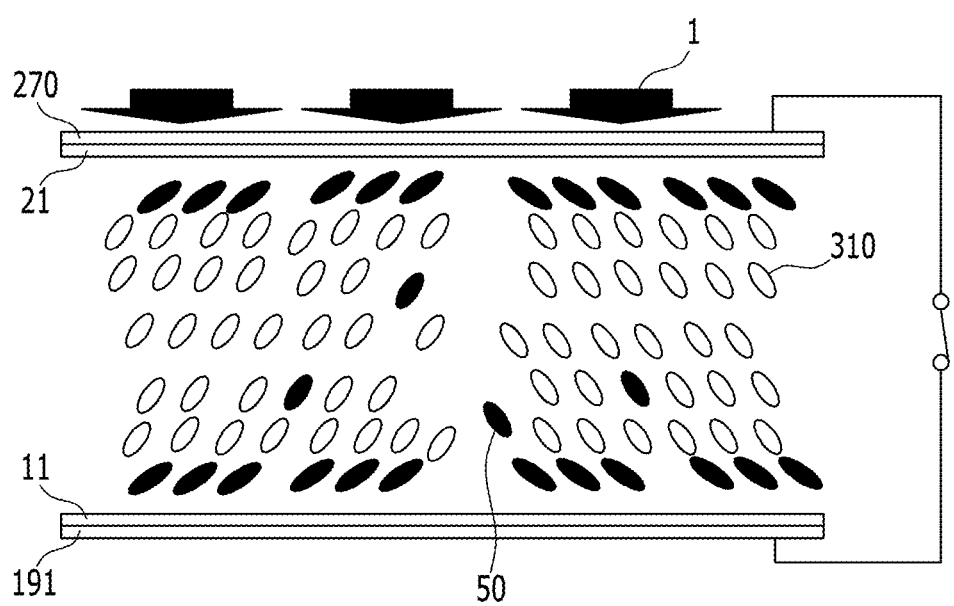
FIG. 13 and FIG. 14 are schematic diagrams of an exemplary method for forming pre-tilt in liquid crystal molecules using an alignment auxiliary agent (reactive mesogen) according to the present disclosure.
Figure 14:
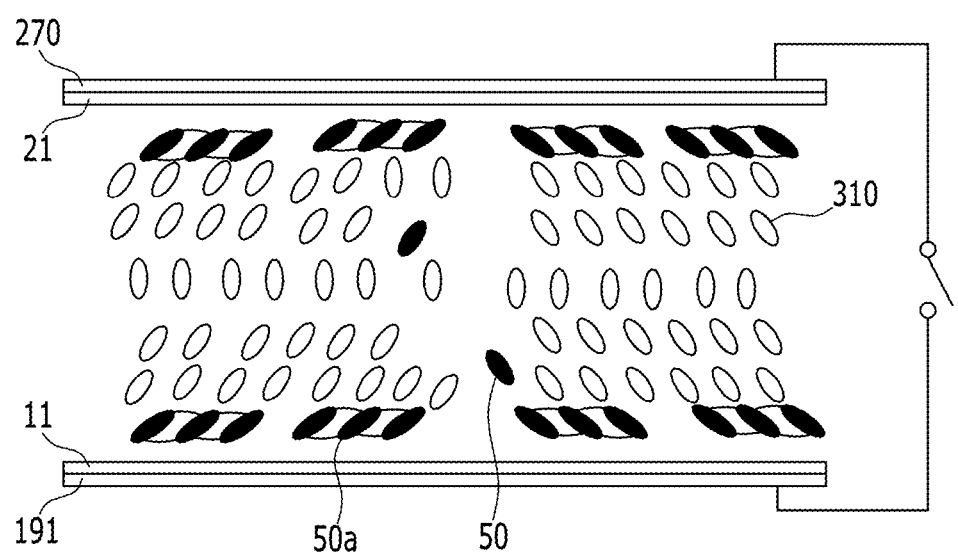

FIG. 13 and FIG. 14 are schematic diagrams of an exemplary method for forming pre-tilt in liquid crystal molecules using an alignment auxiliary agent (reactive mesogen) according to the present disclosure.

Referring to FIG. 1, FIG. 2, and FIG. 13, constituent elements included in the lower panel 100 and the upper panel 200 can be respectively manufactured. In the lower panel 100, the lower alignment layer 11 is formed on the pixel electrode 191. Hereinafter, a method for forming the alignment layers 11 and 21 will be described.

An alignment material for forming a polymer including a main chain and side chains is coated to the pixel electrode 191 to form the lower alignment layer 11 through a process such as baking and the like. Similarly, an alignment material for forming a polymer including a main chain and side chains is coated to the common electrode 270 to form the upper alignment layer 21 through a process such as baking and the like. The liquid crystal layer 3 including the liquid crystal molecules 310 and a reactive mesogen 50, which is an alignment auxiliary agent, is formed between the pixel electrode 191 and the common electrode 270.

Light 1 is irradiated while an electric field is applied between the pixel electrode 191 and the common electrode 270.

Afterward, referring to FIG. 2 and FIG. 14, the reactive mesogen 50, mixed with the liquid crystal molecules 310, is photo-reacted and forms an alignment polymer 50a having a pre-tilt. In this case, a photo-reactor included in the end portion of the side chain of each of the alignment layers 11 and 21 may increase the reactivity of the reactive mesogen 50, thereby maximizing the reactivity of the reactive mesogen while minimizing the amount of residual, non-reacted reactive mesogen.

The alignment polymers are arranged along the alignment of the liquid crystal molecules 310 and maintain the alignment after the applied voltage has been removed, thereby controlling a pre-tilt of the liquid crystal molecule 310.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A curved liquid crystal display comprising:
a first substrate;
a second substrate facing the first substrate;
a liquid crystal layer between the first substrate and the second substrate and including liquid crystal molecules;
a first alignment layer between on the first substrate and the liquid crystal layer; and
a second alignment layer between the second substrate and the liquid crystal layer,
wherein the first alignment layer and the second alignment layer respectively comprise a polymer comprising at least one main chain and a plurality of side chains connected to the main chain, and
wherein the polymer of the first alignment layer comprises at least one side chain comprising at least one of a photo-reactor and a photo-reactor derivative, and the side chains of the polymer of the second alignment layer do not comprise the photo-reactor and the photo-reactor derivative.

2. The curved liquid crystal display of claim 1, further comprising bumps on at least one of the first alignment layer and the second alignment layer, wherein the bumps comprise an alignment polymer.

3. A curved liquid crystal display comprising,
a first substrate;
a second substrate facing the first substrate;
a liquid crystal layer between the first substrate and the second substrate and including liquid crystal molecules;
a first alignment layer between the first substrate and the liquid crystal layer; and
a second alignment layer between the second substrate and the liquid crystal layer,
wherein the first alignment layer and the second alignment layer respectively comprise a polymer comprising at least one main chain and a plurality of side chains connected to the main chain,
wherein at least one of the polymer of the first alignment layer and the polymer of the second alignment layer comprises at least one side chain comprising at least one of a photo-reactor and a photo-reactor derivative, and
wherein a density of the bumps on the first alignment layer is greater than a density of the bumps disposed on the second alignment layer.

4. The curved liquid crystal display of claim 3, wherein a size of the bumps on the first alignment layer is smaller than the size of the bumps on the second alignment layer.

5. The curved liquid crystal display of claim 1, wherein the at least one of the photo-reactor and the photo-reactor derivative is positioned at an end of the at least one side chain.

6. The curved liquid crystal display of claim 1, wherein the photo-reactor is represented by Chemical Formula 3A or Chemical Formula 3B, and the photo-reactor derivative is a derivative of the photo-reactor represented by Chemical Formula 3A-1 or Chemical Formula 3B-1:

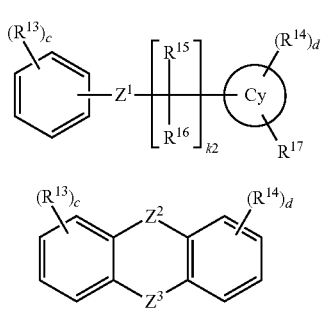

Chemical Formula 3A-1

Chemical Formula 3B-1 wherein, Cy is a C6 to C18 aryl group or a C6 to C18 cycloalkyl group; $R^{13}$ to $R^{14}$ are independently hydrogen or a substituted or unsubstituted C1 to C8 alkyl group; $R^{15}$ and $R^{16}$ are independently a hydroxy group or a substituted or unsubstituted C1 to C8 alkoxy group; $R^{17}$ is hydrogen, a hydroxy group, or a substituted or unsubstituted C1 to C8 alkoxy group; c and d are independently integers of 0 to 4; k2 is an integer of 0 to 5; $Z^1$ and $Z^2$ are independently —C(=O)—; and $Z^3$ is —S— or —C(=O)—.

7. The curved liquid crystal display of claim 6, wherein the photo-reactor comprises at least one compound represented by Chemical Formula 3-1, Chemical Formula 3-2, Chemical Formula 3-3, Chemical Formula 3-4, and Chemical Formula 3-5:

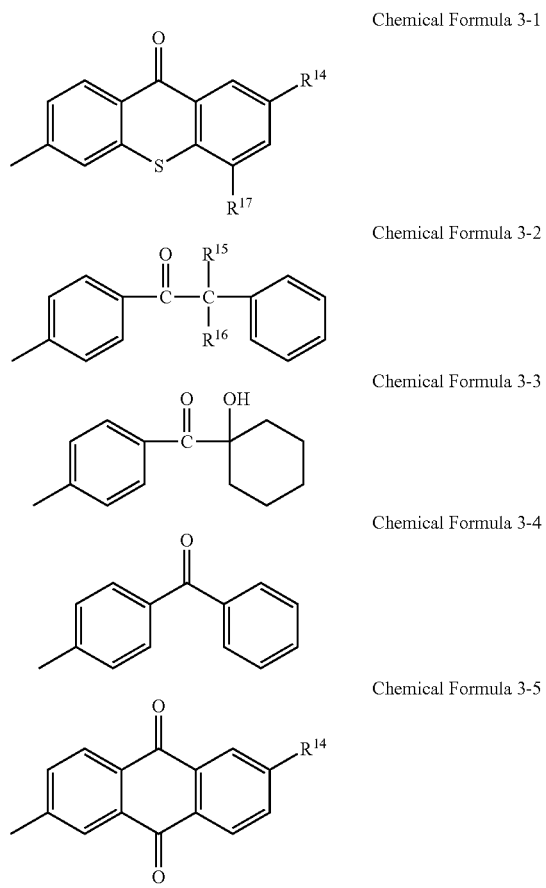

wherein, $R^{14}$ is independently hydrogen or a substituted or unsubstituted C1 to C8 alkyl group; $R^{15}$ and $R^{16}$ are respectively independently a hydroxy group or a substituted or unsubstituted C1 to C8 alkoxy; and $R^{17}$ is hydrogen, a hydroxy group or a substituted or unsubstituted C1 to C8 alkoxy group.

8. The curved liquid crystal display of claim 1, wherein a pre-tilt of liquid crystal molecules adjacent to the first alignment layer and a pre-tilt of liquid crystal molecules adjacent to the second alignment layer are different from each other.

9. The curved liquid crystal display of claim 8, wherein the pre-tilt of the liquid crystal molecules adjacent to the first alignment layer is greater than the pre-tilt of the liquid crystal molecules adjacent to the second alignment layer.

10. The curved liquid crystal display of claim 9, wherein the first substrate and the second substrate comprise curved sides.

11. The curved liquid crystal display of claim 9, wherein the liquid crystal molecules adjacent to the second alignment layer are substantially perpendicular to the second alignment layer.

12. The curved liquid crystal display of claim 1, wherein the at least one side chain further comprises a vertical alignment group.

13. A method for manufacturing a curved liquid crystal display, comprising:
forming a pixel electrode on a first substrate;
forming a common electrode on a second substrate;
forming a first alignment layer on the pixel electrode;
forming a second alignment layer on the common electrode;
forming a liquid crystal layer between the first alignment layer and the second alignment layer, the liquid crystal layer comprising liquid crystal molecules and a reactive mesogen;
irradiating the liquid crystal layer with light while applying an electric field; and
forming the first substrate and the second substrate to have curved sides,
wherein the first alignment layer and the second alignment layer respectively comprise a polymer comprising at least one main chain and a plurality of side chains connected to the main chain, and
wherein the polymer of the first alignment layer comprises at least one side chain comprising a photo-reactor, and the polymer of the second alignment layer does not comprise the photo-reactor.

14. The method for manufacturing the curved liquid crystal display of claim 13, wherein irradiating the liquid crystal layer with light comprises polymerizing the reactive mesogen and forming bumps on at least one of the first alignment layer and the second alignment layer.

15. The method for manufacturing the curved liquid crystal display of claim 14, wherein density of the bumps on the first alignment layer is greater than density of the bumps on the second alignment layer.

16. The method for manufacturing the curved liquid crystal display of claim 15, wherein, after the irradiating the liquid crystal layer with light, a pre-tilt of liquid crystal molecules adjacent to the first alignment layer is greater than a pre-tilt of liquid crystal molecules adjacent to the second alignment layer.

17. The method for manufacturing the curved liquid crystal display of claim 16, wherein the polymer of the second alignment layer comprises at least one side chain comprising a vertical alignment group.

18. The method for manufacturing the curved liquid crystal display of claim 13, further comprising irradiating the liquid crystal layer with ultraviolet (UV) light.

19. The curved liquid crystal display of claim 3, wherein the photo-reactor is represented by Chemical Formula 3A or Chemical Formula 3B, and the photo-reactor derivative is a derivative of the photo-reactor represented by Chemical Formula 3A-1 or Chemical Formula 3B-1:

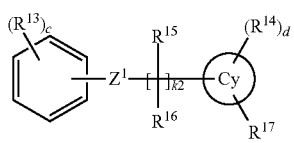

Chemical Formula 3A-1

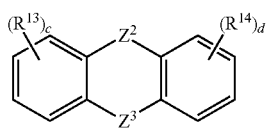

Chemical Formula 3B-1 wherein, Cy is a C6 to C18 aryl group or a C6 to C18 cycloalkyl group; $R^{13}$ to $R^{14}$ are independently hydrogen or a substituted or unsubstituted C1 to C8 alkyl group; $R^{15}$ and $R^{16}$ are independently a hydroxy group or a substituted or unsubstituted C1 to C8 alkoxy group; $R^{17}$ is hydrogen, a hydroxy group, or a substituted or unsubstituted C1 to C8 alkoxy group; c and d are independently integers of 0 to 4; k2 is an integer of 0 to 5; $Z^1$ and $Z^2$ are independently —C(=O)—; and $Z^3$ is —S— or —C(=O)—.

20. The curved liquid crystal display of claim 19, wherein the photo-reactor comprises at least one compound represented by Chemical Formula 3-1, Chemical Formula 3-2, Chemical Formula 3-3, Chemical Formula 3-4, and Chemical Formula 3-5:

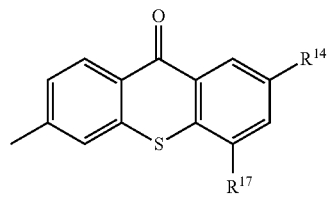

Chemical Formula 3-1

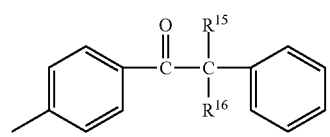

Chemical Formula 3-2

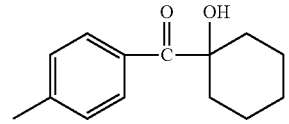

Chemical Formula 3-3

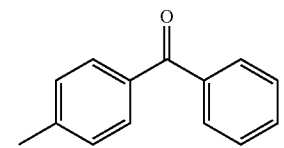

Chemical Formula 3-4

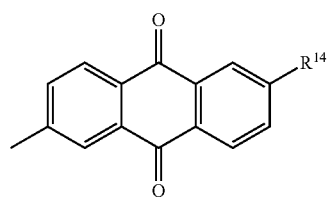

Chemical Formula 3-5 wherein, $R^{14}$ is independently hydrogen or a substituted or unsubstituted C1 to C8 alkyl group; $R^{15}$ and $R^{16}$ are respectively independently a hydroxy group or a substituted or unsubstituted C1 to C8 alkoxy; and $R^{17}$ is hydrogen, a hydroxy group or a substituted or unsubstituted C1 to C8 alkoxy group.

21. The curved liquid crystal display of claim 3, wherein the polymer of the first alignment layer comprises the at least one side chain comprising at least one of the photo-reactor and the photo-reactor derivative, and the side chains of the polymer of the second alignment layer do not comprise the photo-reactor and the photo-reactor derivative.

22. The curved liquid crystal display of claim 2, wherein a density of the bumps on the first alignment layer is greater than a density of the bumps disposed on the second alignment layer.

23. The curved liquid crystal display of claim 22, wherein a size of the bumps on the first alignment layer is smaller than the size of the bumps on the second alignment layer.

\* \* \* \* \*